United States Patent [19]

Hundeby et al.

[11] Patent Number: 5,042,589
[45] Date of Patent: Aug. 27, 1991

[54] MULTI-TINE CULTIVATOR FRAME SUSPENSION AND ADJUSTMENT MECHANISM

[75] Inventors: David R. Hundeby, Saskatoon; Brent G. Hergott, Martenville, both of Canada

[73] Assignee: Flexi-Coil Limited, Saskatoon, Canada

[21] Appl. No.: 574,889

[22] Filed: Aug. 30, 1990

[51] Int. Cl.$^5$ .................. A01B 63/14; A01B 63/32
[52] U.S. Cl. .................. 172/462; 172/482; 172/707; 172/310
[58] Field of Search ............... 172/462, 321, 452, 458, 172/464, 474, 475, 663, 478, 479, 662, 482, 613, 634, 635, 639, 643, 310, 311, 707, 708, 456

[56] References Cited

U.S. PATENT DOCUMENTS

| | | | |
|---|---|---|---|
| 2,828,680 | 4/1958 | Johnson | 172/310 |
| 4,186,805 | 2/1980 | Repski | 172/310 |
| 4,396,069 | 10/1983 | Ferber et al. | 172/310 |
| 4,479,549 | 10/1984 | Fegley | 172/311 |

FOREIGN PATENT DOCUMENTS

| | | | |
|---|---|---|---|
| 295055 | 1/1965 | Australia | 172/643 |
| 278657 | 10/1988 | European Pat. Off. | 172/311 |
| 991457 | 5/1965 | United Kingdom | 172/456 |

OTHER PUBLICATIONS

Summers Manufacturing Co., Inc. Pamphlet GA-18-46-1186-5MJ "Summers Supertiller", Maddock N.D. 58348, 1986.
Remlinger Manufacturing Company, Inc. Leaflet 16394 U.S. 224 "RTC-600 M-Series Roller Tine Cultivator" Kalida, Ohio 45853.

Primary Examiner—Dennis L. Taylor
Assistant Examiner—Spencer Warnick
Attorney, Agent, or Firm—D. Ron Morrison

[57] ABSTRACT

The invention disclosed relates to a mechanism for adjusting the level, tine working depth, and tine working angle of a framework supporting a multiplicity of cultivator tines. The framework is cantilevered from and behind a boom drawn on wheels, and includes a pair of rock shafts that are:

1) rotated together to adjust the working depth of the tines,
2) rotated relative to one another to adjust the level of the working depth of the tines; the working angle of the tine is adjusted by mechanical rotation of frame tubes forming part of the framework and on which the tines are directly mounted.

The invention disclosed also includes a novel hydraulic circuit for powered rotation of the transverse frame tubes and of the boom between a working position when the tines are engaged with the ground and a transport position when the tines are clear of the ground and the framework carried in a position facilitating transport.

17 Claims, 7 Drawing Sheets

MULTI-TINE CULTIVATOR FRAME SUSPENSION AND ADJUSTMENT MECHANISM

This invention relates to a mechanism for mounting the tines of an agricultural cultivator to allow various desirable adjustments to be made to the tines of a multi-tine cultivator, working angle of the tines, and leveling of the multiple tines with reference to the ground. More particularly it relates to a mechanism having a generally rectangular grid of two or more parallel transverse frame tubes, to which the tines are fastened, and parallel longitudinal draw tubes to which the frame tubes are pivotally attached. Preferably the invention includes means to lift and hold the tines free of the ground to clear them of trash and the mechanism of the present invention is adapted to operate in conjunction with such means and also means to lift and hold the tines on the aforementioned grid free of the ground in a transport position. In a more preferred form of the invention, the means to lift and hold the tines for transport is adapted also to hold, draw, and lift for transport additional earth working implements which, as is known in the art, can be drawn behind a first earth working implement. In a still more preferred form of the invention, the adjustments to the tines of a cultivator for depth of cultivation, working angle of the tines, and leveling of the multiple tines with reference to the ground are mechanically set manually, and the means to lift and hold the tines for transport is powered hydraulically. In a most preferred form of the invention the hydraulic powered means includes separate hydraulic cylinders respectively for lifting the tines from the ground and for holding them for transport optionally with additional earth working implements which are attached behind the tines. These and other features of the invention will be better understood from the following description of details of the invention.

Resilient tine cultivators having multiple resilient tines fastened to a framework, which is drawn over the ground to engage the points of the tines in the ground and drag them through the earth, are old in the art. The resilient tines are generally made of spring steel and usually are in the general form of the letter "C" or of the letter "S", and have one end of the shaped tine fastened to a rigid frame bar or tube and the other end held in position by its fastening to penetrate and cultivate the ground as it is dragged therethrough. Usually several rigid frame bars are arranged in parallel, each with several tines fastened thereto, to carry a large multiplicity of resilient tines, the frame bars being held in parallel arrangement by their attachments to the means to pull them forward, for example parallel drawbars forming a rectangular grid with the frame bars.

An early example of a simple framework as described above is given in French patent 350,243, issued 28 Nov. 1905 to Soc.P. Viaud et Cie; this disclosure shows a grid of two draw tubes or draw bars supporting three frame bars carrying a total of nine simple "C" tines. A set of wheels on a levered parallelogram arrangement can be lowered manually to lift the grid and raise the tines above the ground for transport. There is no disclosure of any adjustments to the tines to control leveling of the grid, depth of cultivation, or working angle of the tines.

A more modern cultivator is disclosed by B. Vachon in Canadian patent 1,172,500 issued 14 Aug 84 (and in corresponding U.S. Pat. No. 4,446,925). This reference discloses a cultivator with a mechanical arrangement for leveling the tines from front to rear of a cultivator frame to achieve level (uniform depth of) penetration of the ground by the tines; it also discloses a combined mechanical and hydraulic or pneumatic power arrangement to adjust the frame height relative to ground level for adjustment of the depth of cultivation of the tines. However there is no disclosure nor suggestion of any means for adjusting or varying the pitch or working angle of the tines.

An even more sophisticated machine is described in the Summers Manufacturing Co., Inc. pamphlet GA-1846-1186-5MJ printed in 1986 in U.S.A. describing Summers Supertiller, an "S" tine cultivator adaptable for adjustment of depth of cultivation and working angle of the tines. While leveling of the machine itself is referred to, no details of the nature of the leveling are given, i.e. whether it is front to-back leveling of the three frame bars carrying the three rows of tines, or side-to-side leveling of the machine The machine is notable for the ability of the lift bars to which the tine bars are attached, also to draw and carry two additional ground working tools, namely harrows and light packer rods The working depth of the cultivator tines is established by a combination of mechanical adjustment and hydraulically powered rotation of the frame bars carrying the tines to vary their working angle. However, the mechanical adjustment of the tines for working depth requires alteration of each individual support attaching the frame bars to the lift bars—a total of a dozen supports each held by at least two bolts, for three ranks of tines attached to the four lift bars of each section of the three section cultivator.

The working angle of the tine shanks is important because it relates to the working depth of the tine as well as being affected by the soil type, moisture conditions, and various other factors. It is therefore most desirable that tine shank angle be adjustable independently of adjustments to the working depth of the tine; it also is most desirable that such adjustments can be made simply, quickly, and easily in the field, for example when different soil conditions are encountered or when the conditions change significantly between one field and another.

The invention thus consists in a mechanism for adjusting the level and tine working depth of a multiplicity of tines mounted on a framework which includes at least two spaced transverse frame tubes on which said tines are mounted and at least two longitudinally aligned draw tubes to which said frame tubes are attached, comprising a) two transverse rock shafts, rotatable on their respective longitudinal axes, from which the front and back ends respectively of said draw tubes are pivotally suspended, on axes parallel to and adjacent the rock shafts.

b) means to rotate said rock shafts simultaneously in the same direction to adjust by equal amounts the level of the ends of the draw tubes suspended beneath the rock shafts, and c) means to rotate said rock shafts relative to one another, whereby the levels of the back and front ends of the draw tubes are adjusted relative to one another.

The invention more particularly consists in a mechanism for mounting the tines of a multi-tine cultivator having two or more transversely aligned parallel rows of tines, said mechanism comprising a) a rigid boom, adapted to be drawn by a tractor and transversely aligned behind said tractor, b) a series of spaced parallel lift arms fastened to said boom and longitudinally aligned behind said boom, c) a front rock shaft rotatably mounted transversely on and near the front of said lift arms, d) a rear rock shaft rotatably mounted transversely on said lift arms and spaced from the front rock shaft and parallel thereto, e) a series of front lift links, each pivotally attached at its top end to said front rock shaft on a common transverse pivotal axis spaced from said front rock shaft, f) a series of parallel, longitudinally aligned, substantially horizontal, lower draw tubes, each pivotally attached at its front end to a respective one of said front lift links and being generally aligned beneath a respective one of said lift arms, g) a series of longitudinally aligned front draw links, each being pivotally attached at its back end to the pivotal attachment of a respective one of said lower draw tubes to its respective front lift link and being pivotally attached at its front end to a pivotal attachment fastened to the front of the bottom of said boom, h) a series of spaced, parallel, transversely aligned, substantially horizontal, rigid, frame tubes, mounted on top of said lower draw tubes, each being pivotally attached on the front thereof to each of said lower draw tubes.

i) a series of rear lift links, each pivotally attached at its bottom end to a respective pivotal attachment fastened to the frame tube mounted nearest the back of said lower draw tubes and being pivotally attached at its top end to said rear rock shaft on a common transverse pivotal axis spaced from said rear rock shaft, j) a horizontally and longitudinally aligned depth adjusting clevis, adjustably fastened at its front end to fastening means on said boom in front of said front rock shaft, the back end of said adjusting clevis being pivotally attached to a depth adjusting flange fastened below said front rock shaft, k) a horizontally aligned rigid rotation transfer means pivotally connecting said depth adjusting flange of said front rock shaft to a depth adjusting flange fastened below said rear rock shaft.

The invention further consists in a hydraulic circuit adapted to control the positions of at least two hydraulic cylinders separately with pressure from one reversible hydraulic pump, said circuit comprising a) a first fluid line conducting hydraulic fluid from a first side of said hydraulic pump through a throttle check orifice adapted to impede the flow of fluid into said line from said first side of said pump without impeding flow in the reverse direction, b) a second fluid line conducting hydraulic fluid from said first line to the base end of each cylinder to be controlled by the circuit, c) a third fluid line conducting hydraulic fluid from the piston end of each cylinder being controlled by the circuit to the return side of said hydraulic pump, d) a bypass fluid line connecting
(1) said second fluid line from a point between
  (a) the base ends of one or more cylinders to be controlled by said circuit and
  (b) the base ends of one or more cylinders to be separately controlled by said circuit, to
(2) said third fluid line, said bypass fluid line containing
  (a) a pressure operated valve adapted to close the bypass line when all the cylinders to be controlled are to be extended by pressure in said first line and to open the bypass line when all the cylinders to be separately controlled are not to be extended by pressure in said first line, and
  (b) a check valve adapted to preclude flow of fluid from said third fluid line through the bypass to said second fluid line.

The present invention provides for simple, quick and easy adjustment of the working depth and working angle of cultivator tines on a cultivator grid, as well as for simple, quick, and easy front-to-back leveling of the grid with respect to ground level. Additionally, the invention is adapted to accommodate one or two more earth working implements which can by drawn by, and carried for transport by, the same lift bars that carry the cultivator tine grid of the present invention. However, the invention is not limited to the inclusion of such additional implements which may include, for example, harrows and packers that would enable a field to be cultivated, harrowed, and packed in a single pass. The invention may be better understood from the following description read in conjunction with the accompanying drawings in which:

Figure 1:
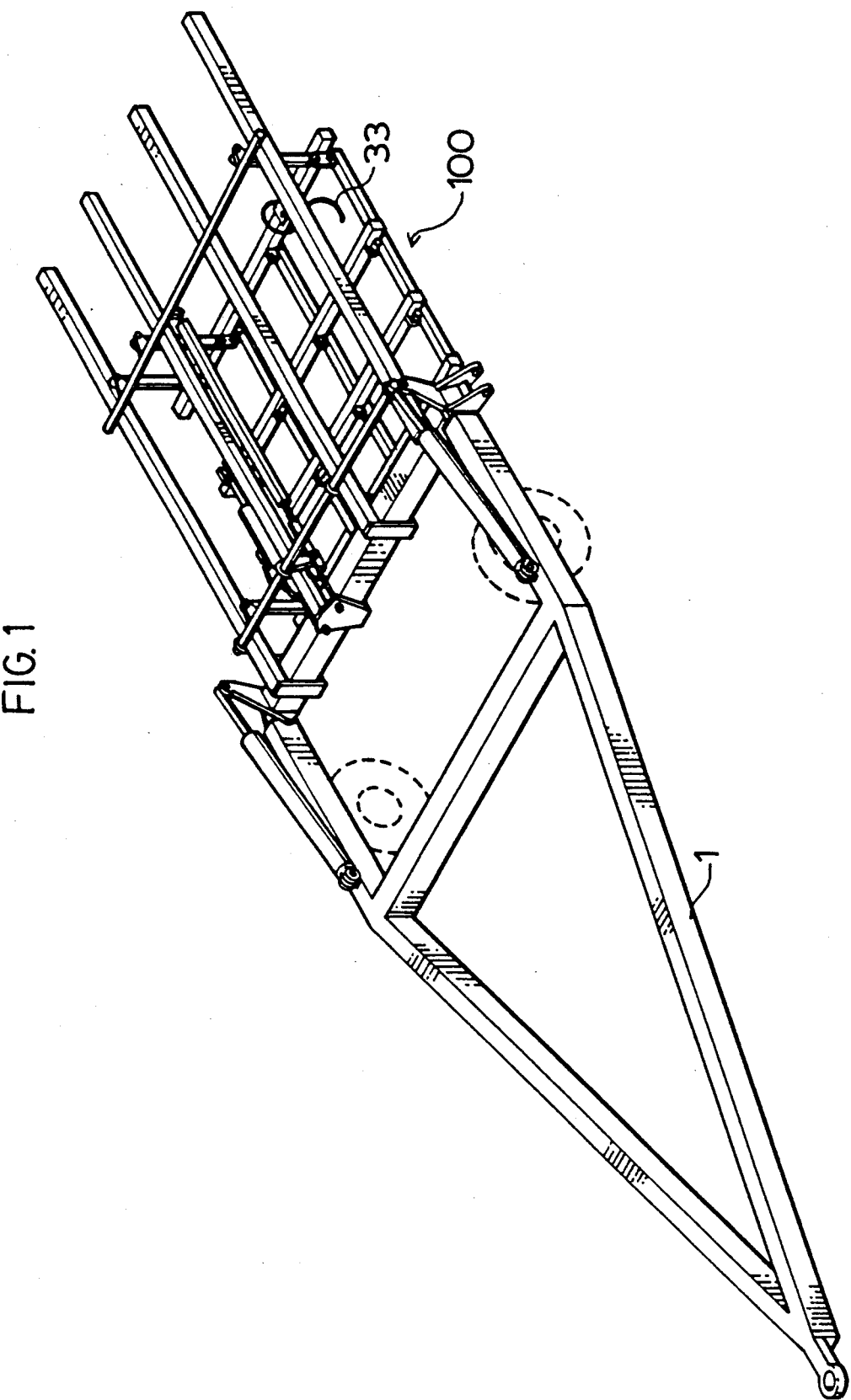
FIG. 1 illustrates an isometric projection of a cultivator frame having the essential cultivator parts for use with the present invention.
Figure 2:
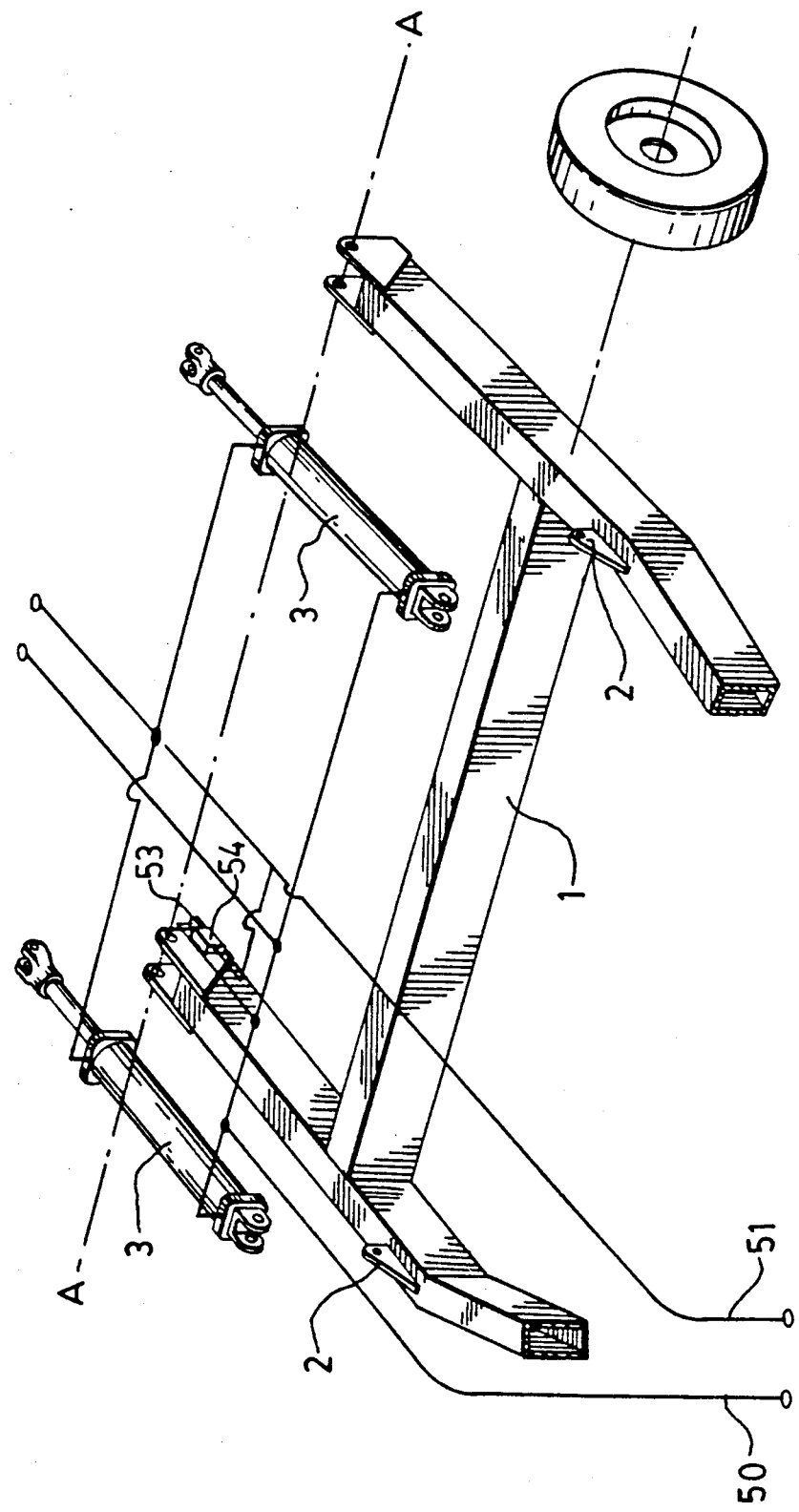
FIG. 2 illustrates, in an exploded isometric view, the back part of an 'A' frame wheeled carriage of which the front end would be attached to and drawn by a tractor (not shown) when in working position; the back part is adapted to be attached to the main boom of the present invention.

Turning now to details of the invention, as shown in the drawings, FIG. 1 shows a wheeled support carriage used to draw and carry the grid 100 supporting multiple tines, 33, of the cultivator of the invention, most simply a carriage or cart, having its front end adapted to attach to and be carried and drawn by a tractor and its back end supported on an appropriate number of wheels to carry the weight, usually at least two and preferably two pairs mounted on a common axis near the back of the carriage. FIG. 2 shows the back end of such an "A" frame carriage 1, having two lugs, 2, on the "A" frame legs for pivotal attachment of the bases of two hydraulic cylinders, 3; these pivotal attachments are on a common axis. At the extreme back of the carriage, on the ends of the "A" frame legs, are flanges forming parts of hinges by which the main boom of the cultivator is pivotally attached to the carriage on the axis marked A—A by the dot-dash line. Only one wheel is shown, for clarity.

Figure 3:
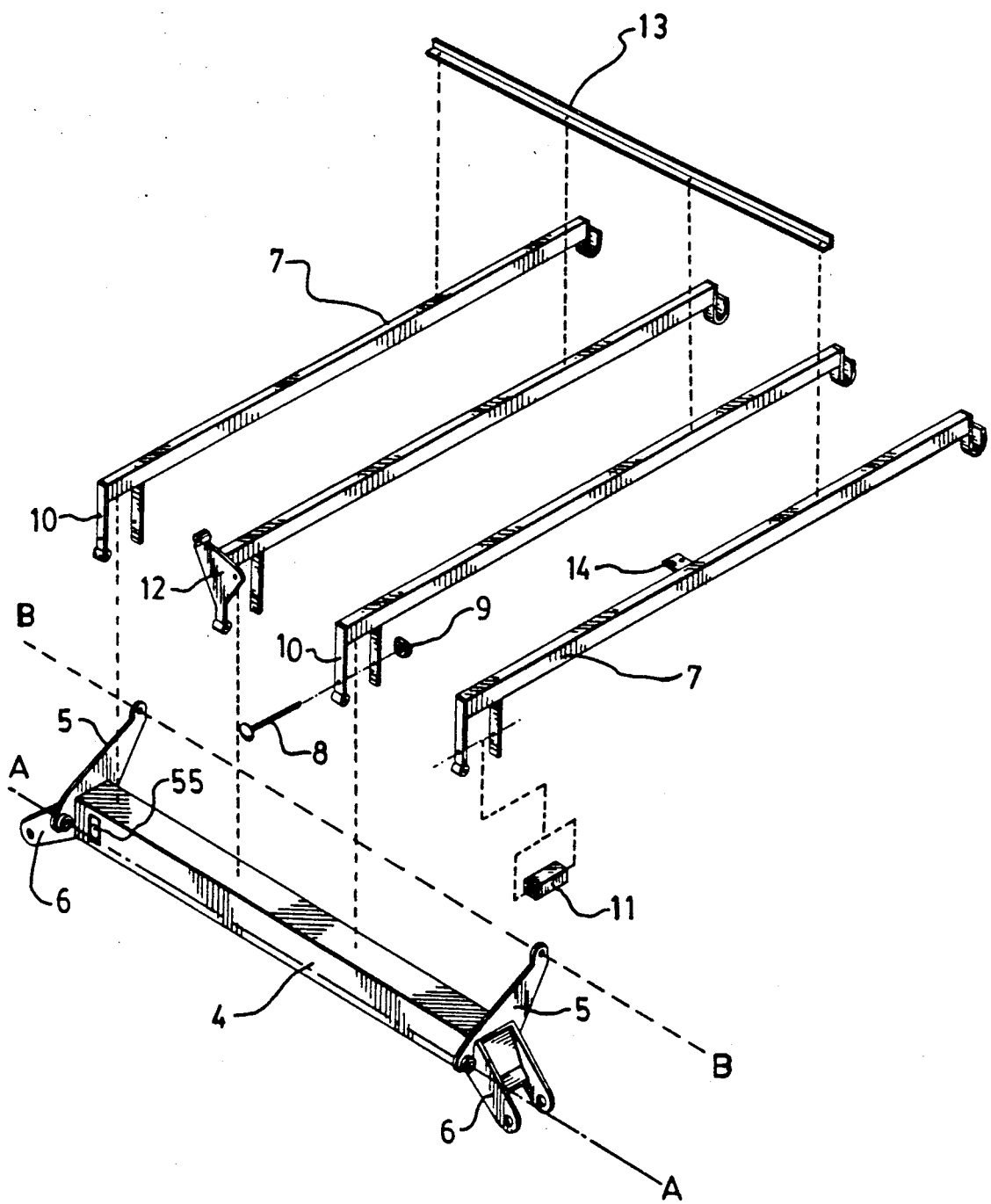
FIG. 3 illustrates, in another exploded isometric view, a main boom and four lift arms to be fastened in cantilever fashion to the main boom, to carry a grid supporting multiple cultivator tines.

FIG. 3 shows a rigid main boom, 4, having a heavy attachment flange, 5, rigidly fastened at each end thereof, with an aperture on each flange in front of the boom for attachment of the boom to the carriage on previously mentioned A—A axis, also shown in this Figure, by appropriate boom pivot pins. An upswept portion of each attachment flange 5 projects behind the main boom with apertures aligned on axis B—B therein for attachment of the rod ends of the hydraulic cylinders, 3. With the bases and rod ends of these cylinders appropriately attached extension and contraction of the cylinders causes rotation of the main boom on the A—A axis, so the main boom can be rotated through 90 degrees to lower the cultivator, and any attached auxiliary implements, to working position in contact with the ground or raise it in the air into a transport position On each flange 5, outside the ends of the boom, there is, optionally, one-half of a universal hinge, 6, rigidly attached. Another half of such a universal hinge, attached to the end of a similar boom permits a wing boom to be attached to each end of the main boom, to form a multi-section boom that can be both rotated by the center section thereof, from a working position to a transport position, and folded into a narrow configuration for transport, in a manner well known in the farm implement art. The distal ends of such wing section booms conventionally are carried on their own wheels and do not require the support of a carriage or cart. Conventionally also, the distal ends of such wing section booms are drawn by boom draws attached at their front ends to the carriage in known manner when in working position.

Mounted on top of the main boom 4, in cantilever manner, are a number of longitudinally aligned parallel lift arms, 7; the number is not critical, but preferably is even, with alternate pairs being of alternating lengths for reasons mentioned later herein and already known in the art. Each of the lift arms is fastened to the boom, preferably by bolting with a bolt and nut, 8 and 9, retaining an inverted U shaped clamp, 10, as shown under the end of the lift arm, and having a spacer, 11, to ensure rigidity of the U-bolt arms. One of the lift arms on each main boom additionally has a rigid plate, 12, referred to herein as a cylinder mount plate, rigidly fastened on the front end thereof, optionally and conveniently acting as one of the arms of the inverted U-shaped clamp. This plate, 12, conveniently having a fan shape as shown, acts as the anchor points for two adjustably positioned parts described later, the parts being positioned on either side of the lift arm and aligned generally parallel thereto. To impart more rigidity to the lift arms 7, they optionally are fastened together near the back end thereof, for example by bolting them together with a lift arm brace. 13. One of numerous similar brackets, 14, is shown fastened rigidly to one of the lift arms, 7; its purpose is described later.

Figure 4:
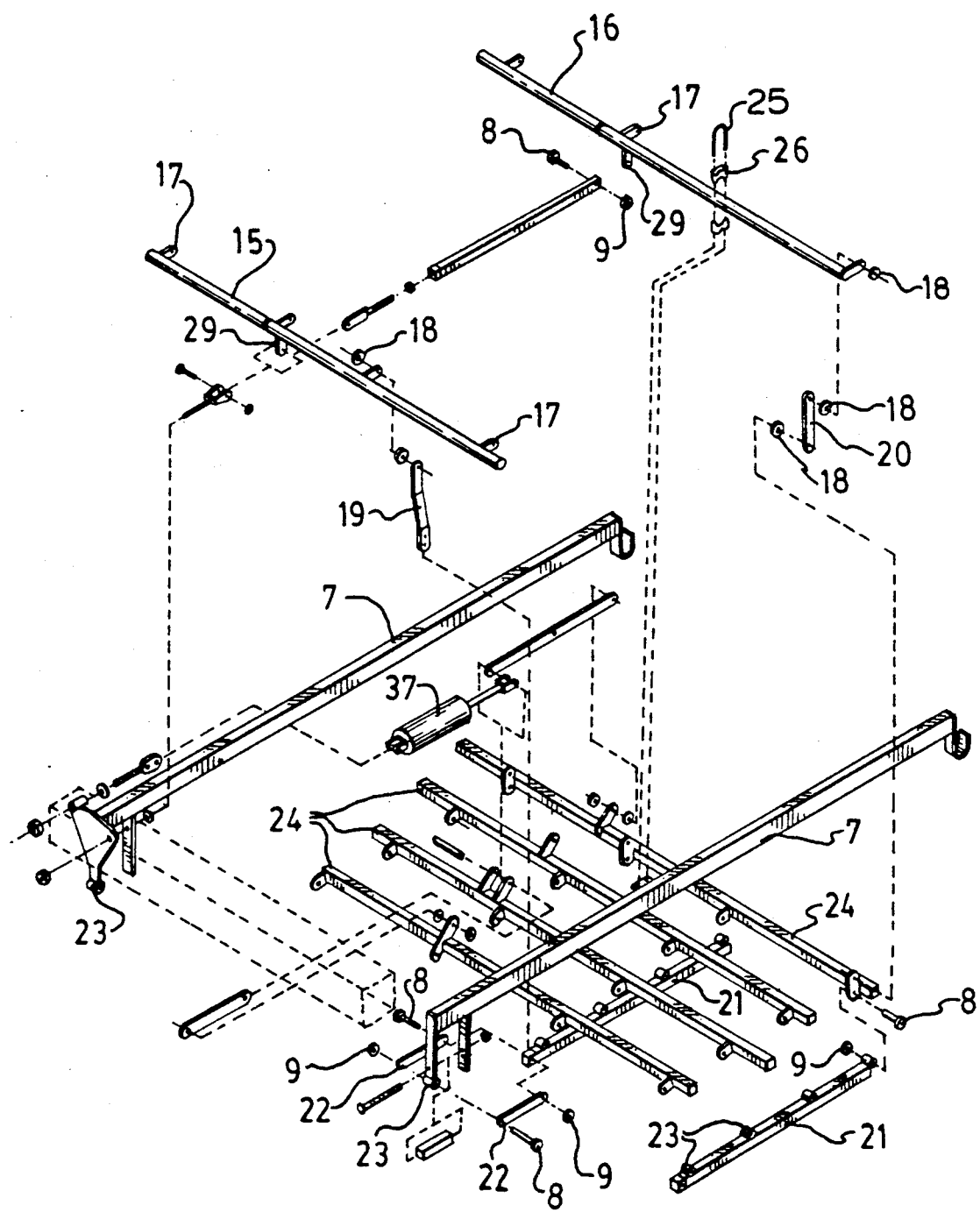
FIG. 4 illustrates, in another exploded isometric view, a number of the essential parts comprising the grid of members which support a multiplicity of cultivator tines to be drawn through the ground at a uniform adjustable depth and penetration angle of the tines.

Turning now to FIG. 4, two of the lift arms 7 are shown, specifically the second and fourth ones from the left of FIG. 3; the others are omitted for clarity of illustration. The top elements illustrated in this figure are the transversely aligned front and rear rock shafts, 15 and 16, respectively. The front rock shaft has four rigid perforated flanges, 17, fastened thereto, extending rearwardly, and the rear rock shaft has three similar flanges, each flange projecting rearwardly and being perforated to receive a loose bolt and nut arrangement or a machine bushing, 18, appropriately held by a cotter pin (not shown). Pivotally attached to each front rocker shaft flange by said bolt or bushing is the top end of a respective front lift link, 19, only one being shown. Pivotally attached to each rear rock shaft flange in the same manner is the top of a respective rear lift link. 20, only one being shown. The bottom ends of the four front lift links are each pivotally attached to the front end of a respective longitudinally aligned lower draw tube or bar, 21, conveniently of square cross section, two of such tubes being shown in FIG. 4, in positions under the third and fourth lift arms 7 of FIG. 3 respectively. Also pivotally attached to the front end of each lower draw tube and the front lift link by the same bolt and nut attachment, are the back ends of a respective pair of parallel front draw links, 22. The front ends of the links 22 are pivotally attached by a bolt and nut arrangement to a pivot bushing, 23, fastened at the bottom end of the front part of the respective U-shaped clamp 10 on the front of the lift arm 7.

Each of the four lower draw tubes 21 has four pivot bushings 23 fastened on top thereof, spaced longitudinally along the tube. Transversely aligned in parallel across the top of tubes 21 are four frame tubes, 24, conveniently of square cross section, each with four rigid perforated flanges fastened to and projecting forwardly on its front face, for pivotal attachment by suitable bolt and nut arrangements to the appropriate four pivot bushings on the draw tubes 21. An appropriate number of curved cultivator tines, for example conventional "C" tines or preferably the more flexible but resilient conventional "S" tines are fastened to the frame tubes 24 in a spaced pattern to provide uniform cultivation across the width of the cultivator.

As shown in FIG. 4, three of the four forwardly projecting perforated flanges on rear frame bar 24 also have a second perforation on an upwardly projecting portion, and these three second perforations are each pivotally connected, conveniently by a respective machine bushing, 18, to the bottom end of a respective rear lift link 20. Four such links are not essential, hence three conveniently are used and shown. Pivotally attached to the three perforated flanges on the rear rock shaft are the top ends of the three respective rear lift links 20, as previously mentioned. Thus the rear frame tube is pivotally linked directly to the rear rock shaft and the back ends of the four lower draw tubes are linked to the rear rock shaft through the rear frame bar, which pivots on said draw tubes In contrast the front ends of the four lower draw tubes are pivotally directly linked, by the front lift links, to the front rock shaft flanges 17. The front and rear rock shafts are attached rotatably to the four lift arms, preferably close to their points of intersection, attaching to previously mentioned brackets 14, conveniently by inverted U bolts, 25, with plastic bushings, 26, to facilitate rotation of the rock shafts.

From the foregoing paragraph it can be seen that the back end of the grid formed by the draw tubes and frame tubes can be raised or lowered with reference to the lift arms 7 by appropriate rotation of the rear rock shaft to which it is attached. Likewise it can be seen that the front end of said grid can be raised or lowered similarly by appropriate rotation of the front rock shaft to which it is attached The mechanism for rotating the rock shafts to adjust the height of the grid and the corresponding depth to which the cultivator tines penetrate the ground, and the mechanism by which front-to-back leveling of the grid is obtained and maintained, will now be described with reference to FIG. 5.

Figure 5:
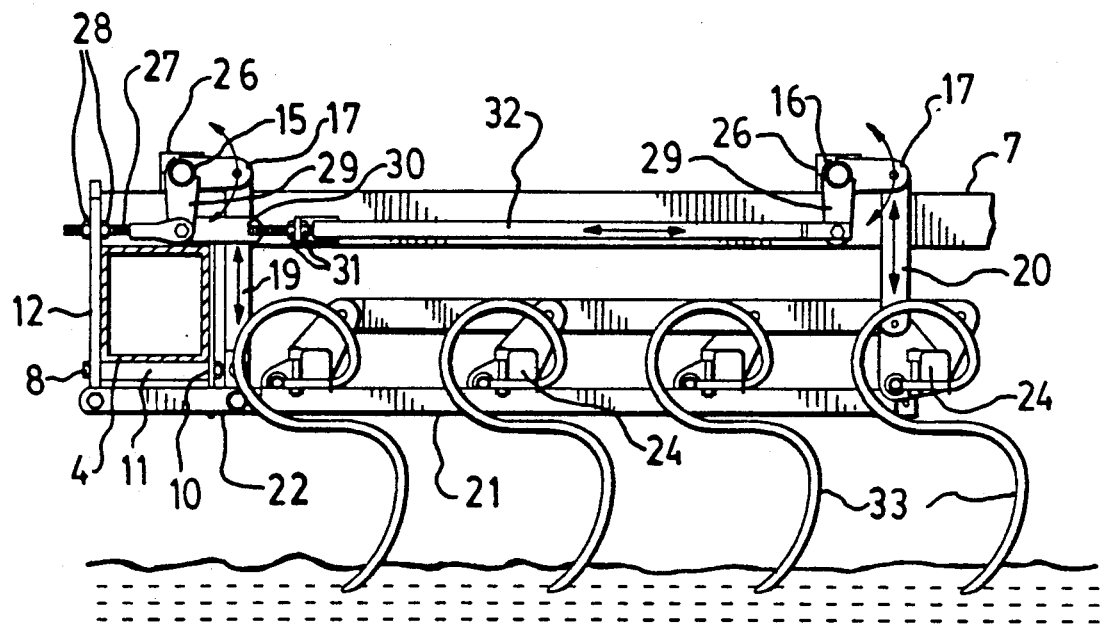
FIG. 5 shows a side view of the linked lever arrangement by which the rows of tines are leveled from front to back so that each row of tines penetrates the ground to the same depth, and by which that depth is adjusted.

FIG. 5 is a side view of part of the left side of the lift arm 7, second from the left of the four lift arms in FIG. 3. The lift arm is cantilevered from main boom 4, and held in place by fastening means, for example the cylinder mount plate 12, spacer 11, clamp 10 and bolt and nut 8 and 9, (FIG. 3). The front and rear rock shafts 15 and 16 are held in place on the lift arm 7 by inverted U bolts through the plastic bushings 26 and bracket 14 on the lift arms The threaded end of a horizontally aligned depth adjusting clevis, 27, is held adjustably in place in an aperture through one side of plate 12 by two depth adjusting nuts 28, and positioned horizontally by loosening and tightening these nuts appropriately. The distal end of the clevis is pivotally attached to a depth adjusting flange 29 fastened beneath front rock shaft 15 Also pivotally attached to flange 29 on the same pivotal axis is a horizontally aligned rigid rotation transfer means connecting said depth adjusting flange pivotally to an identical depth adjusting flange fastened below said rear rock shaft, which transfer means can be a single straight rigid rod but, to permit independent leveling adjustments is preferably, for example, the front pivot end of a level adjusting rod, 30, the distal end of which is threaded and adjustably clamped by two level adjusting nuts, 31, to the front end of a level adjusting tube, 32. The distal end of the level adjusting tube is pivotally attached to another downwardly projecting depth adjustment flange 29 fastened on the bottom of the rear rock shaft 16. The grid supporting the set of cultivating tines 33 of the implement includes the lower draw tube 21 (of which there are three not showing) and the pivotally attached four frame tubes 24. The front end of the draw tube 21 is pivotally attached to, and supported by, the lower end of front lift link 19 and the back end of draw tube 21 is pivotally attached to the back frame tube 24 which in turn is pivotally attached to and supported by rear lift links 20. Horizontal displacement of the depth adjusting clevis 27, by adjustment of the clamping position of the nuts 28 on its threaded shank, causes equal horizontal displacement of the level adjusting rod 30 and level adjusting tube 32, and simultaneously causes equivalent rotation of the depth adjusting flanges 29 and the front and rear rock shafts 15 and 16 around the respective rock shaft axes In turn the perforated flanges 17 on the rock shafts, set at right angles to the depth adjusting flanges 29, raise or lower the front and rear lift links 19 and 20, thereby adjusting the depth to which tines 33 penetrate the ground on being dragged therethrough supported ultimately by the lift arms 7 clamped to the main boom 4 carried by the carriage wheels riding on the ground. Thus simple loosening of the two depth adjusting nuts 28, repositioning of the threaded shank of depth adjusting clevis 27 in cylinder mount plate 12 to cause rotation of the rock shafts, and retightening of the nuts 28 for the new position of the clevis 27, are the only actions required to alter, simultaneously, the depth penetration of the whole set of cultivator tines on the grid supported by those rock shafts.

An initial setting must be made for leveling, from front to rear, of the grid of a new machine, and the setting should be adjusted periodically to compensate for any distortion of the front to rear level of the grid, torsional deflections of wing booms, and variations between wing and center booms. To set or adjust the level of the grid, the implement must be parked on level ground. Then referring to FIG. 5, with the tines in working position, front and rear rows of tines in the grid must be set to operate at the same working depth. If front and rear rows are not the same working depth, the two level adjusting nuts 31 are loosened and the level adjusting tube 32 is moved longitudinally to rotate the rear rock shaft 16 relative to the front rock shaft and cause an appropriate raising or lowering of the rear lift link 20 until the front and rear rows of tines 33 operate at the same working depth in the ground When this criterion has been achieved, the level adjusting nuts 31 are tightened on the threaded shank of level adjusting rod 30 and the adjustment has been completed.

From the foregoing description of the methods of adjusting the grid for level and depth of penetration by the tines, it can be seen that the adjustments can be made easily, simply, and quickly, and also independently of each other, so that changing the depth of penetration of the tines does not alter the front to back level of the tine grid.

The mechanism for adjusting the working angle of shanks of the tines relative to the ground is now to be described with reference to FIG. 6. This figure shows a side view of part of the right hand side of lift arm 7 shown in FIG. 5 The cylinder mount plate 12 has an aperture near its top right hand side which preferably is reinforced by an inclined hollow reinforcing cylinder 34, rigidly fastened through the plate, to serve as a firm base for anchoring the threaded shank end of a cylinder mount lug, 35, which is held in position in the cylinder 34 by two cylinder mount nuts, 36 The distal end of the lug 35 is perforated for pivotal attachment to the base of a hydraulic cylinder, 37. The rod end of the cylinder 37 is pivotally attached to a pair of upwardly projecting cylinder flanges, 38, located and fastened rigidly, conveniently on the second frame tube from the front of the grid. Also pivotally attached to these flanges and the cylinder rod end is the back end of a rigid front cylinder link, 39, and the front end of a rigid rear cylinder link 40 The front end of the front cylinder link 39 is pivotally attached to another flange 38 fastened rigidly to the front frame tube 24. Similarly the middle and back end of the rear cylinder link 40 are pivotally attached respectively to the third and fourth frame tubes 24, counting from the front of the grid. From FIG. 6 it can be seen that in side view, the flanges 38 form three parallelograms with the draw tube 21 and the front and rear cylinder links 39 and 40. Horizontal displacement of the two cylinder links 39 and 40 by retraction or extension of the rod of cylinder 37 distorts all three parallelograms equally and causes each frame tube 24 to pivot an equal angle around its point of pivotal attachment to its respective draw tube 21. Rotation of the frame tubes causes equivalent rotation of the respective tines 33 around the same pivotal axes, thus altering the tine working angle With the piston of cylinder 37 fully extended the tine working angle can be adjusted by loosening the cylinder mount nuts 36, repositioning the cylinder mount lug 35 in reinforcing cylinder 34 thus causing rotation of the frame bars 24 and tine shanks 33 to the desired angle, and tightening the nuts 36.

Figure 7:
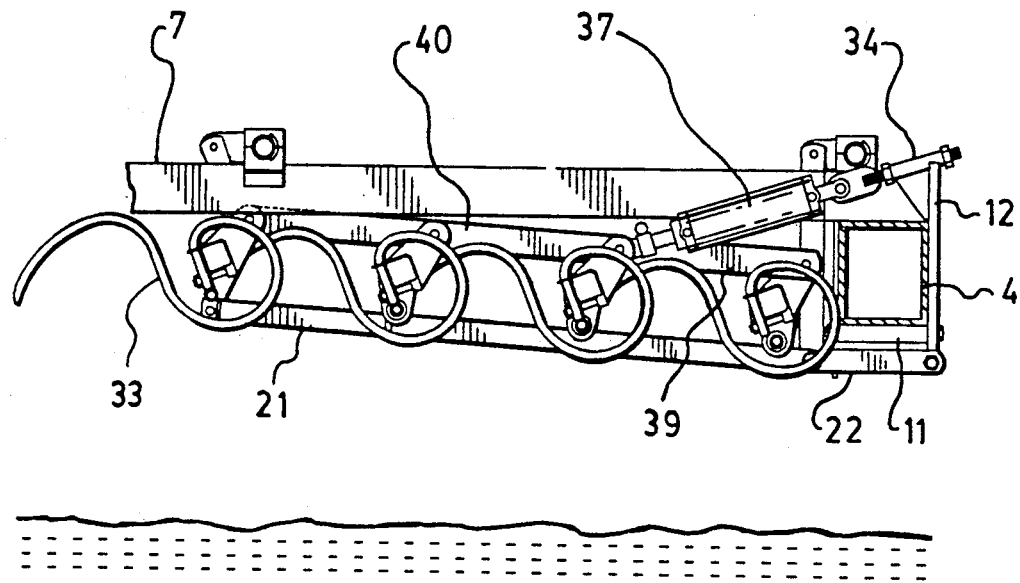
FIG. 7 shows a side view of the same arrangement shown in FIG. 6, but with the cultivating tines rotated to their transport position.

When it desired to move the implement from one location to another without having the tines in the ground, the tines are simply rotated to a transport position by fully retracting the piston of hydraulic cylinder 37, causing rotation of the frame tubes 24 around their pivot axes on the draw tubes 21 and rotation and retraction of the tines to a position shown in FIG. 7.

Conversion of the implement between working and transport positions by the preferred hydraulic system is now to be explained. It is well known in the art to use hydraulic cylinders to lift the frames supporting earth working tools by pivoting a boom supporting them around a pivot axis by means of hydraulic cylinders For the tine adjusting mechanism of the present invention this can be achieved simply by contracting the cylinders 3 shown in FIG. 2 to pivot the boom 4 around the A—A axis, shown in FIG. 3, thus raising lift arms 7 and lifting them and the grid in the air to a vertical plane position for transport. The hydraulic cylinders can be operated by pressure in an hydraulic circuit powered by the tractor used to pull the cultivator, as is well known in the art. As is also well known in the art, the lift arms 7 also can be used to support and pull other earth working implements in addition to cultivator tines, for example harrows and packers For this reason it is preferred to have the lift arms 7 of FIG. 3 long enough also to support and pull harrows attached under the lift arms behind the cultivator tine grid, for example by link chains, and heavy coiled packer rolls attached at the back of the lift arms by appropriate drawbar arrangement, for example as disclosed in U.S. Pat No. 4,821,809 and Canadian P. 1,212,569.

It is for this reason that alternate pairs of the lift arms preferably are of different lengths as mentioned previously herein, so that heavy packer rolls can be drawn behind harrows under lift arms 7 and accommodated and safely transported when carried in a transport position. However, it is not essential that harrows and heavy packers be used with the adjustment mechanism of the invention claimed herein, nor that alternate pairs of the lift arms in the present invention be of different lengths.

Figure 9:
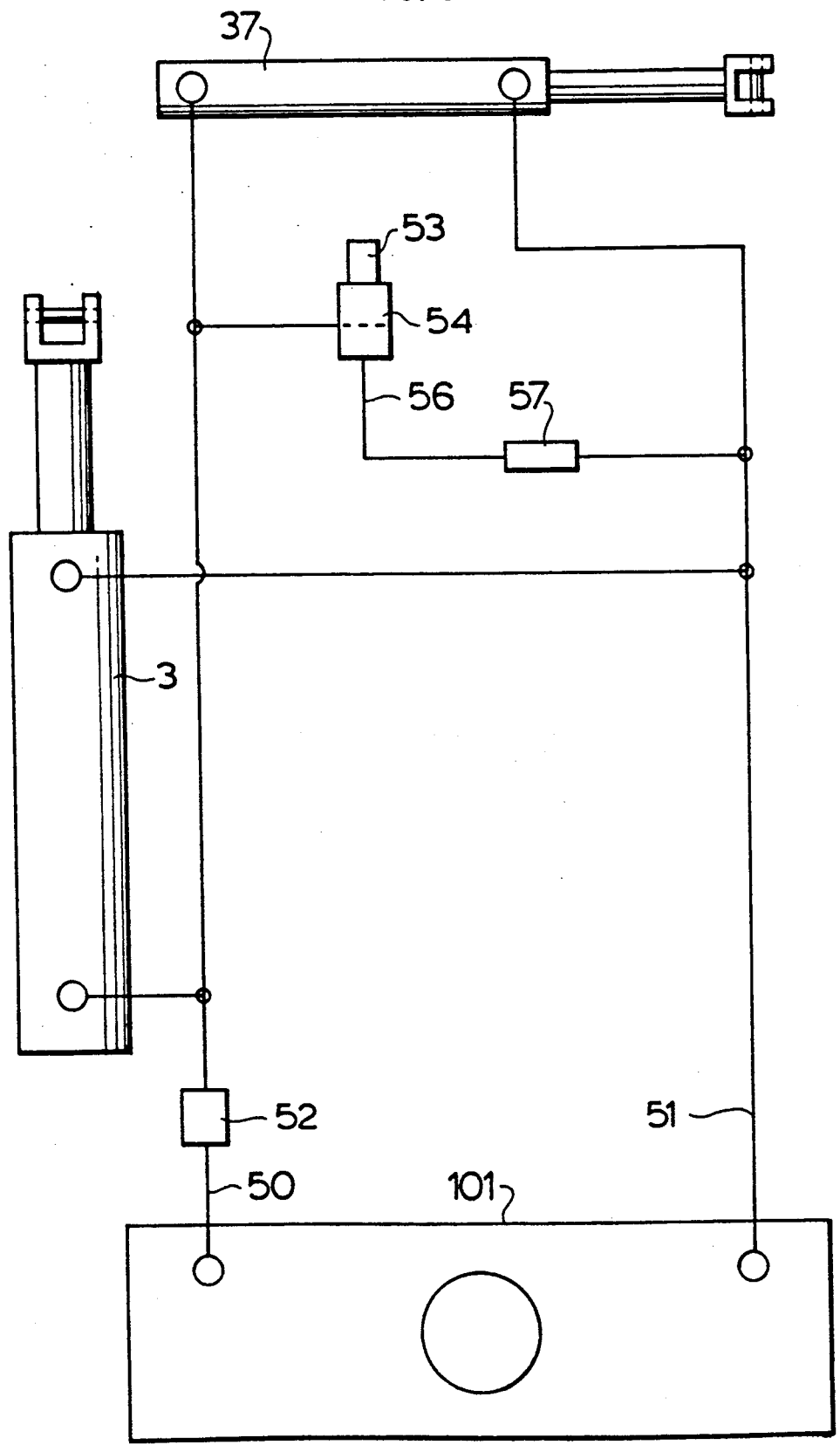
FIG. 9 shows schematically the essential elements of a novel hydraulic circuit on which the preferred hydraulic circuit of FIG. 8 is based.

Turning now to FIG. 9, the novel basic hydraulic circuit of this invention is represented by FIG. 9 showing the reversible hydraulic pump, 101, generally on a tractor and used to power the hydraulic cylinders of equipment used with the tractor. In the novel circuit, fluid pressure to extend one or plural parallel connected hydraulic cylinders of a first group of cylinders can be applied simultaneously with the application of fluid pressure to extend one or plural parallel connected hydraulic cylinders of a second group of cylinders and optionally the same pressure can be bypassed through a unidirectional bypass, which can be opened manually or automatically, between the two groups of cylinders In FIG. 9, cylinders 3 and 37, corresponding to the cylinders 3 and 37 of FIGS. 2 and 4, represent the first and second group of cylinders respectively. Each of 3 and 37 can represent a group of hydraulic cylinders that are connected in parallel to operate synchronously. Characteristically, the cylinders of the first group of cylinders are utilized to raise large loads against the force of gravity, which loads subsequently have to be lowered relatively gently, requiring some resistance to gravity, while cylinders of the second group are utilized to exert substantially similar forces when either contracting or extending Fluid from pump 101 is pressurized into line 50 through throttle check valve 52 which impedes fluid flow from the pump without impeding reverse flow to the pump in line 50; from valve 52 fluid flows to the base of cylinder 3 and any other cylinders of the first group connected in parallel with it Simultaneously fluid from line 50 can flow past cylinder 3 and any others to a bypass line 56 or beyond the bypass line to the base of cylinder 37 and any other cylinders of the second group connected in parallel with it. Bypass line 56 contains a depth stop valve or other valve which can conveniently be closed to prevent flow through bypass line 56. From valve 54 fluid flows to return line 51 through a check valve 57 which precludes return flow through the bypass from line 51 to line 50 when the pump is reversed.

With the hydraulic circuit as described above, valve 54 can optionally be maintained in an open or a closed position, either manually or by an appropriate mechanical arrangement, for example, a valve biased open by spring pressure and closed by positioning of two parts, one of which is positioned relative to the other by movement of a hydraulic cylinder in the circuit. When valve 54 is open, the check valve 57 prevents fluid flow through the bypass from line 51 to line 50, hence pressure applied by pump 101 into line 51 is applied simultaneously to the piston ends of both cylinders 3 and 37 so that both will be fully retracted when the pressure is maintained for sufficient time. When valve 54 is closed, either by a deliberate manual action or an appropriate mechanical arrangement, again there can be no fluid flow through the bypass from line 51 to line 50. Furthermore, with valve 54 closed, there can be no fluid flow through the bypass from line 50 to line 51 when pump 101 is operated to apply pressure in this direction. In these circumstances, pressure applied by pump 101 is applied simultaneously to the base ends of both cylinders 3 and 37 and both will be fully extended when the pressure is maintained for sufficient time. However, when valve 54 is open, pressure applied by pump 101 into line 50 can cause fluid to flow through the bypass without buildup of pressure in the bases of, and without causing extension of either of cylinders 3 and 37. When there is a load of any kind on any of the cylinders tending to extend them when pressure is being applied through line 50 and the bypass is open, the cylinders under load are able to extend, fluid flowing from the piston ends thereof back to pump 101 via line 51, but because of the throttle choke orifice which impedes the flow from the pump into line 50, the cylinders under load will extend primarily under the force of their loads and not pressure from the pump, which will be directed primarily through the open bypass back through line 51.

Figure 6:
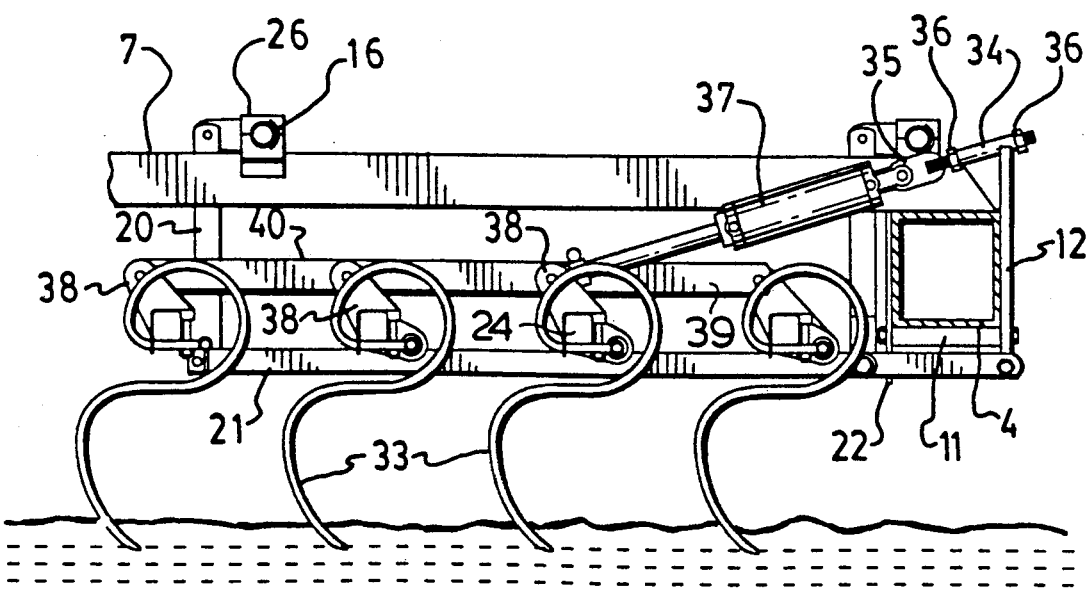
FIG. 6 shows a side view of the hydraulic powered linked lever arrangement by which the tine shank angle is adjusted for varying soil conditions and the tines rotated free of the ground for transport.

Returning now to other Figures, the hydraulic cylinder 37 of FIGS. 6 and 7 also is conveniently powered by hydraulic lines from the same tractor, and may be operated independently from the lift cylinders 3 by using a separate hydraulic circuit. However, in a preferred form, the lift cylinders 3 and the tine rotation cylinder 37 are preferably operated by a single circuit which is exemplified by FIG. 8. The cylinder 37 is kept under pressure in the fully extended position when the tines are working because such cylinders tend to allow fluid to leak back in the circuit unless pressure is maintained.

Figure 8:
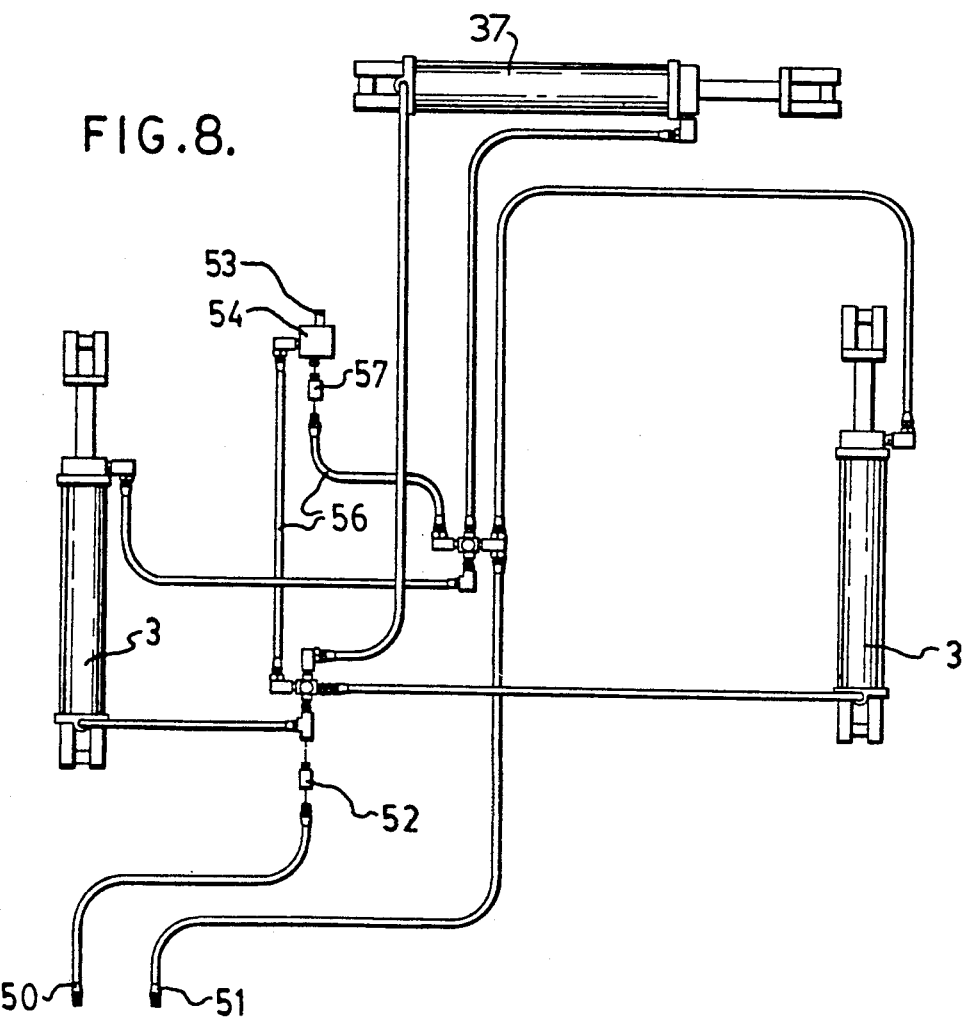
FIG. 8 shows a schematic arrangement of a preferred hydraulic circuit for control of the positions of the main boom and frame bars carrying the tines for working in the field and for transport of the cultivator of the present invention.

The hydraulic circuit exemplified in FIG. 8 is also outlined in FIG. 2 but without the details; only the hydraulic lines, some of which preferably are of steel tubing and others are hydraulic pressure hose, are shown in FIG. 2. Lines 50 and 51 are the hydraulic lines from the hydraulic pump on a tractor, supplying pressure to the single hydraulic circuit of the invention. A number of the small parts shown schematically in FIG. 8 are conventional and need not be further identified, for example hydraulic hoses, steel tubing, TEE fittings, cross fittings, swivel elbows, and others; critical parts of the exemplified circuit are fully identified herein. Assuming that the equipment has just been transported to a working location and is to be put to work, the implement is in transport position and all cylinders are fully retracted, thus the cultivator tines would be in position shown in FIG. 7 and the cylinders 3 of FIG. 2 would be retracted, holding the main boom 4 with the lift arms 7 pointing vertically upwards, rather than horizontally as in FIG. 3. For safety during transport, the boom should be secured in this position by a sturdy safety catch to obviate the need for maintaining hydraulic pressure during transport. When the safety catch is released, fluid pressure can be applied to line 50, where fluid must first flow through a throttle check orifice, 52. This orifice impedes the flow of fluid flowing into line 50 from the tractor towards the bases of the cylinders, but does not impede any fluid flow back through line 50. The large weight of the cultivator grid, and any harrows and packers attached to lift arms 7 and being held in the air in the transport position, tends to extend the cylinder pistons and bring them to the ground. As cylinders 3 extend, fluid flows from the piston end of the cylinders through the respective connections and lines of least resistance back through line 51 to the hydraulic pump on the tractor. Because the weight on the lift arms is tending to lower the boom and extend the cylinders 3, the fluid pressure in line 50 does not begin to extend the cylinder 37 until boom 4 has come to rest at the lower limit of its pivot around axis A—A. When it reaches this position, a plunger, 53, in depth stop valve, 54, is pressed fully into the body of the valve, fastened adjustably to the carriage 1, by a pressure point, 55, on the boom 4 (FIGS. 2 and 3), thus closing the depth stop valve 54. The depth stop valve is located in a bypass line, 56 connected between lines 50 and 51, as illustrated in FIG. 8, and the line also contains a one way check valve, 57, preventing fluid from flowing through the bypass from line 51 to line 50 when hydraulic pressure is being applied to the piston end of the cylinders to retract them. With the depth stop valve 54 adjustably positioned on the carriage so that it is closed just when the large cylinders 3 have been fully extended but before the small cylinder 37 starts to extend, the valve 54 and the bypass will be closed only when the large cylinders are fully extended and it is desired to apply pressure to the small cylinder; with the bypass valve 54 open, pressure on line 50 tending to extend the cylinders is bypassed to line 51 through check valve 57. Thus the arrangement of the bypass line 56, the depth stop valve 54 and the one way check valve 57 makes the cylinders double acting (full pressure can be applied either to extend or retract them) at the point of complete extension of the cylinders, but single acting (full pressure can be applied only to retract them) when they are less than fully extended. When the cylinders are pressurized by line 51 to retract, the cylinder 37 will retract completely before the cylinders 3 begin to retract, as the load on the latter is much greater because of the weight of the boom, lift arms, and cultivator grid. Thus the cultivator tines will be retracted into their transport position as in FIG. 7 before the boom starts to raise the lift arms into their transport position.

Obviously instead of a depth stop valve 54 which is operated by positioning of two parts, one of which is positioned relative to the other by movement caused by a hydraulic cylinder in the circuit with the valve, there could be a simple manually controlled valve which could be operated directly or by remote control when the bypass is to be opened or closed.

Turning now to other optional features of the invention, FIG. 3 has shown one half of an optional universal hinge or joint 6. A similar half universal joint or hinge, but with its pivotal axis vertical with the complete hinge in the position shown in FIG. 3, can be used to attach a wing boom section to the main boom section Such wing boom section rotates on axis A—A when main boom 4 is rotated into or out of transport position by cylinders 3, as previously described. Furthermore the universal joint or hinge 6 permits the wing boom section to flex in a vertical direction on the horizontal axis when the implement is working over uneven ground and, when the boom is rotated 90 degrees into transport position, to fold the wing section back into a narrower width transport position on that same axis, which has become vertical, as is well known in the art; also, the other axis which is horizontal in the transport position, permits articulation of the wing section relative to the main boom and in a vertical direction when the implement is being towed in transport, as is conventional in the art.

When wing sections of an implement on each side of a main boom section made according to the invention are to be moved into or out of transport position, they are rotated through the universal joints or hinges by the main boom, as noted above, which is in turn rotated by the cylinders 3. In order to rotate the frame tubes carrying the tines of a wing section according to the preferred form of the invention, a separate hydraulic cylinder corresponding to cylinder 37 in the center section is required for each wing section. With this arrangement, these cylinders are connected in parallel with the hydraulic lines connected to cylinder 37 in FIG. 8. In this manner a multisection cultivator with a center section and two wing sections, each including the mechanism for adjusting the working depth, working angle, and level of the tines of the section in accordance with the present invention, can be operated with a single hydraulic circuit driven by the tractor used to pull the cultivator. Furthermore the cultivator wing sections each can be adjusted for depth of cultivation by a single adjustment on the respective section, and for working angle of the tines by a single adjustment of the respective section, and each section can be individually leveled by a single adjustment on the section.

Numerous modifications can be made in the specific expedients described above without departing from the invention disclosed herein, the scope of which is defined in the following claims.

What is claimed is:

1. A mechanism for mounting the tines of a multi-tine cultivator having two or more transversely aligned parallel rows of tines, said mechanism comprising:
   a) a rigid boom, adapted to be drawn by a tractor and transversely aligned behind said tractor,
   b) a series of spaced parallel lift arms fastened to said boom and longitudinally aligned behind said boom,
   c) a front rock shaft rotatably mounted transversely on and near the front of said lift arms,
   d) a rear rock shaft rotatably mounted transversely on said lift arms and spaced from the front rock shaft and parallel thereto, e) a series of front at its top end to said front rock shaft on a common transverse pivotal axis spaced from said front rock shaft,
f) a generally planar and substantially horizontal framework pivotally attached at its front end to said front lift links and being generally aligned beneath said lift arms,
g) a series of longitudinally aligned front draw links, each being pivotally attached at its back end to the said framework and being pivotally attached at its front end to said boom,
h) a series of rear lift links, each pivotally attached at its bottom end to said framework and being pivotally attached at its top end to said rear rock shaft on a common transverse pivotal axis spaced from said rear rock shaft, and
i) means to rotate the said rock shafts.

2. A mechanism as claimed in claim 1 in which said means to rotate said rock shafts comprises a depth adjusting clevis with a threaded shank at its front end which is adjustably fastened by clamping nuts on said shank on opposite sides of a rigid plate fastened to said boom and with its clevis back end pivotally attached to a depth adjusting flange fastened to said front rock shaft.

3. A mechanism as claimed in claim 2 in which said means to rotate said rock shafts further comprises a horizontally aligned rotation transfer means pivotally connecting the depth adjusting flange, rigidly connected to said front rock shaft, to a depth adjusting flange rigidly connected to said rear rock shaft.

4. A mechanism as claimed in claim 3 in which said rotation transfer means comprises
  (a) an adjusting rod pivoted at its front end on the depth adjusting flange of said rock shaft, and,
  (b) having a threaded shank at its distal end which is adjustably clamped rigidly to one end of a level adjusting tube by level adjusting nuts,
  (c) the distal end of said level adjusting tube being pivotally attached to the depth adjusting flange fastened to said rear rock shaft.

5. A mechanism as claimed in claim 1 wherein said framework comprises a series of parallel, longitudinally aligned, substantially horizontal, lower draw tubes, each pivotally attached at its front end to a respective one of said front lift links, and a series of spaced, parallel, transversely aligned, substantially horizontal, rigid frame tubes, mounted on top of said lower draw tubes, each frame tube being pivotally attached on the front thereof to each of said lower draw tubes the tines being fastened to said rigid frame tubes.

6. A mechanism as claimed in claim 5 and further comprising
  (a) a mount lug, one end of which has a threaded shank fastened by clamping nuts on said shank on opposite sides of the rigid plate fastened to the boom, the distal end of said mount lug being pivotally attached to a flange projecting from one of said frame tubes, and
  (b) a series of rigid links pivotally attached to respective corresponding flanges on each of the other of said frame tubes, said rigid links being in alignment parallel to said lower draw tubes and adapted to rotate each of said frame tubes simultaneously around their respective axes of pivotal attachment to said draw tubes on displacement of the fastened position of said mount lug on said rigid plate.

7. A mechanism as claimed in claim 6 and further including a hydraulic cylinder having its base pivotally connected to said mount lug and its distal piston end forming the distal end of said mount lug and being pivotally attached to the said one of said frame tubes.

8. A mechanism as claimed in claim 5 and further including means for adjusting a working angle of the tines, with respect to the ground, fastened on said frame tubes which are pivotally attached to said draw tubes, said means comprising:
  (a) extensible and retractable means having one end fastened adjustably relative to said framework for longitudinal displacement, and a distal end pivotally attached to one of said frame tubes at a pivot point spaced from the pivotal attachment of said frame tube to said draw tubes,
  (b) rigid links pivotally attaching each of the other frame tubes to said one of said frame tubes and adapted to rotate each of the other frame tubes on their pivotal attachments to said draw tubes when said extensible and retractable means is adjusted to position said one of said frame tubes by rotation on said draw tubes.

9. A mechanism as claimed in claim 8 in which the one end of said extensible and retractable means includes a threaded shank fastened by clamping nuts to said boom and adapted to position said one end of the extensible and retractable means for any desired degree of rotation of said one of said frame tubes about its pivotal attachment to said draw tubes.

10. A mechanism as claimed in claim 9 in which said extensible and retractable means includes a hydraulic cylinder between said one end and said distal end and adapted to rotate said frame tubes and position them on said draw tubes independently of a clamped position of said threaded shank.

11. A mechanism for mounting a framework incorporating the tines of a multi-tine cultivator having two or more transversely aligned parallel rows of tines, said mechanism comprising
  a) a rotatable boom, adapted to be drawn by a tractor and transversely aligned behind said tractor, said boom being rotatable about its length from a working to a non-working position,
  b) a series of spaced parallel lift arms fastened to said boom and longitudinally aligned behind said boom when in said working position and generally vertical when in said non-working position,
  c) a front rock shaft rotatably mounted transversely on said lift arms,
  d) a rear rock shaft rotatably mounted transversely on said lift arms and spaced from the front rock shaft and parallel thereto,
  e) a series of front lift links, each pivotally attached at its top end to said front rock shaft on a common transverse pivotal axis spaced from said front rock shaft,
  f) the said framework being pivotally attached to said front lift links' bottom ends and being generally aligned beneath said lift arms,
  g) a series of longitudinally aligned front draw links, each being pivotally attached at its back end to the said framework and being pivotally attached at its front end to the said boom,
  h) a series of rear lift links, each pivotally attached at its bottom end to said framework and being pivotally attached at its top end to said rear rock shaft on a common transverse pivotal axis spaced from said rear rock shaft, and, j) means for rotation of said rock shafts in unison or separately so as to adjust the elevation of said framework.

12. A mechanism as claimed in claim 11 wherein said means for rotation comprises an extensible and retractable depth adjusting means pivotally attached to a depth adjusting flange fastened to one of said rock shafts.

13. A mechanism as claimed in claim 12 wherein said means for rotation further comprises an extensible and retractable rotation transfer means pivotally connecting the depth adjusting flange on one of said rock shafts to a depth adjusting flange fastened to another of said rock shafts.

14. A mechanism as claimed in claim 13 wherein the framework comprises:

(1) longitudinal draw tubes, and,
(2) transverse frame tubes pivotally attached to the said longitudinal draw tubes, and the mechanism further comprises:

(a) a hydraulic cylinder pivotally and adjustably connected for extension, retraction and longitudinal adjustment between said mechanism and a cylinder flange on one of said transverse frame tubes to rotate said frame tube upon extension, retraction or longitudinal adjustment, and, (b) rigid cylinder links pivotally attached to respective flanges on each of said frame tubes, said rigid links being in alignment parallel to said draw tubes and adapted to rotate each of said frame tubes simultaneously around their respective axes of pivotal attachment to said draw tubes on extension or retraction of said hydraulic cylinder or adjustment of its position.

15. A mechanism as claimed in claim 14 in which the base of said hydraulic cylinder is pivotally attached to one end of a cylinder mount lug, the distal end of said mount lug being a threaded shank fastened by clamping nuts on said shank on opposite sides of a rigid plate fastened to the front of said boom and adapted to adjust the longitudinal position of the base of said cylinder.

16. A mechanism as claimed in claim 15 in which the said rigid plate has a hollow reinforcing cylinder fastened through the plate, in which the threaded shank of the cylinder mount lug is clamped by said clamping nuts.

17. A mechanism as claimed in claim 14 wherein said rear lift links are shorter than said front lift links and are pivotally attached to one of said frame tubes for rotation about a transverse axis spaced from said one of said frame tubes.

* * * * *